United States Patent [19]
Fingerson et al.

[11] Patent Number: 5,492,583
[45] Date of Patent: Feb. 20, 1996

[54] APPARATUS AND METHOD FOR IN-LINE COATING OF PULTRUSION PROFILES

[75] Inventors: Conrad F. Fingerson; John C. Fingerson, both of Chatfield, Minn.

[73] Assignee: Geotek, Inc., Stewartville, Minn.

[21] Appl. No.: 271,236

[22] Filed: Jul. 6, 1994

Related U.S. Application Data

[63] Continuation of Ser. No. 976,898, Nov. 16, 1992, abandoned.

[51] Int. Cl.$^6$ .............................. B05C 11/02; B05C 3/12
[52] U.S. Cl. ................... 156/180; 156/166; 156/433; 156/441; 156/578; 118/124; 118/405; 118/419; 118/420; 425/114
[58] Field of Search ................................ 156/166, 180, 156/181, 433, 441, 431, 432, 578; 118/420, 419, 125, 405; 425/114; 264/137, 135, 174

[56] References Cited

U.S. PATENT DOCUMENTS

| | | |
|---|---|---|
| Re. 30,770 | 10/1981 | Shobert et al. . |
| 1,727,929 | 9/1929 | Berssenbrugge ........................ 118/125 |
| 2,359,751 | 10/1944 | Cummings et al. ................. 118/405 X |
| 2,626,426 | 1/1953 | Stahl ..................................... 118/405 X |
| 2,731,067 | 1/1956 | Miller .................................. 156/423 X |
| 3,067,803 | 12/1962 | Fleury ..................................... 156/431 |
| 3,336,176 | 8/1967 | Medney .................................. 156/173 |
| 3,556,888 | 1/1971 | Goldsworthy ....................... 156/181 X |
| 3,769,127 | 10/1973 | Goldsworthy et al. ............. 156/432 X |
| 3,793,108 | 2/1974 | Goldsworthy . |
| 3,895,896 | 7/1975 | White .................................... 425/114 X |
| 4,393,809 | 7/1983 | Hilker .................................. 118/125 X |
| 4,518,633 | 5/1985 | Walling et al. ..................... 118/125 X |
| 4,532,151 | 7/1985 | Stenlund . |
| 4,772,438 | 9/1988 | Watanabe et al. . |
| 4,861,621 | 8/1989 | Kanzaki . |
| 4,873,128 | 10/1989 | Ma et al. . |
| 4,883,690 | 11/1989 | Carter . |
| 4,938,823 | 7/1990 | Balazek et al. ........................ 156/166 |
| 5,098,496 | 3/1992 | Breitigam ............................... 156/180 |
| 5,120,380 | 6/1992 | Strachan ............................. 156/180 X |
| 5,326,592 | 7/1994 | Goewey et al. . |

FOREIGN PATENT DOCUMENTS

| | | | |
|---|---|---|---|
| 1190717 | 7/1985 | Canada ................................. 156/180 |
| 933993 | 8/1963 | United Kingdom ................. 156/180 |
| 1206946 | 9/1970 | United Kingdom ................. 425/114 |

OTHER PUBLICATIONS

B. Arpin, P. G. Lafleur, and V. Lenir; "Computer Aided Design of Wire Coating Dies," pp. 58–61, *ANTEC '91*, May 5–9, 1991, Montreal.

E. Mitsoulis, R. Wagner, and F. L. Heng; "Numerical Simulation of Wire–Coating Low–Density Polyethylene: Theory and Experiments," pp. 291–310, *Polymer Engineering and Science*, Mid–Mar., 1988, vol. 28, No. 5.

*Primary Examiner*—Jeff H. Aftergut
*Attorney, Agent, or Firm*—Merchant, Gould, Smith, Edell, Welter & Schmidt

[57] ABSTRACT

A method and apparatus for a low-cost, single-step method of in-line coating of pultrusion profiles to eliminate surface degradation of pultruded profiles due to outdoor exposure or corrosive attack. The method comprises pulling a combination of reinforcing fibers and resin through a pultrusion die to form a pultruded part, applying a coating to the pultruded part after it exits the pultrusion die and curing the coating on the coated pultruded part. The apparatus contains a pultrusion die for forming a pultruded part of a predetermined shape, a coating die with an exit area generally greater than the inlet area, a coating chamber located between the entrance and exit area of the coating die for applying a coating to the pultruded part, and a curing element for curing the coating on the pultruded part after it exits the coating die.

30 Claims, 8 Drawing Sheets

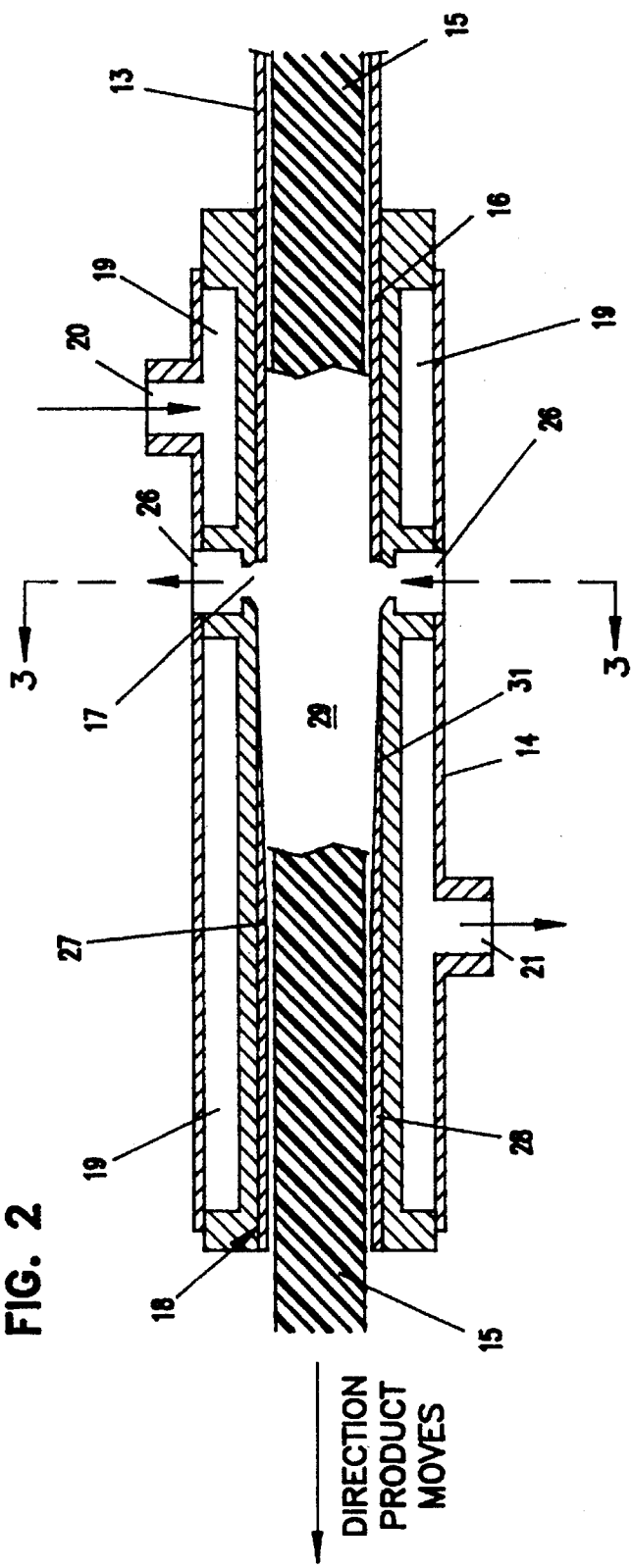

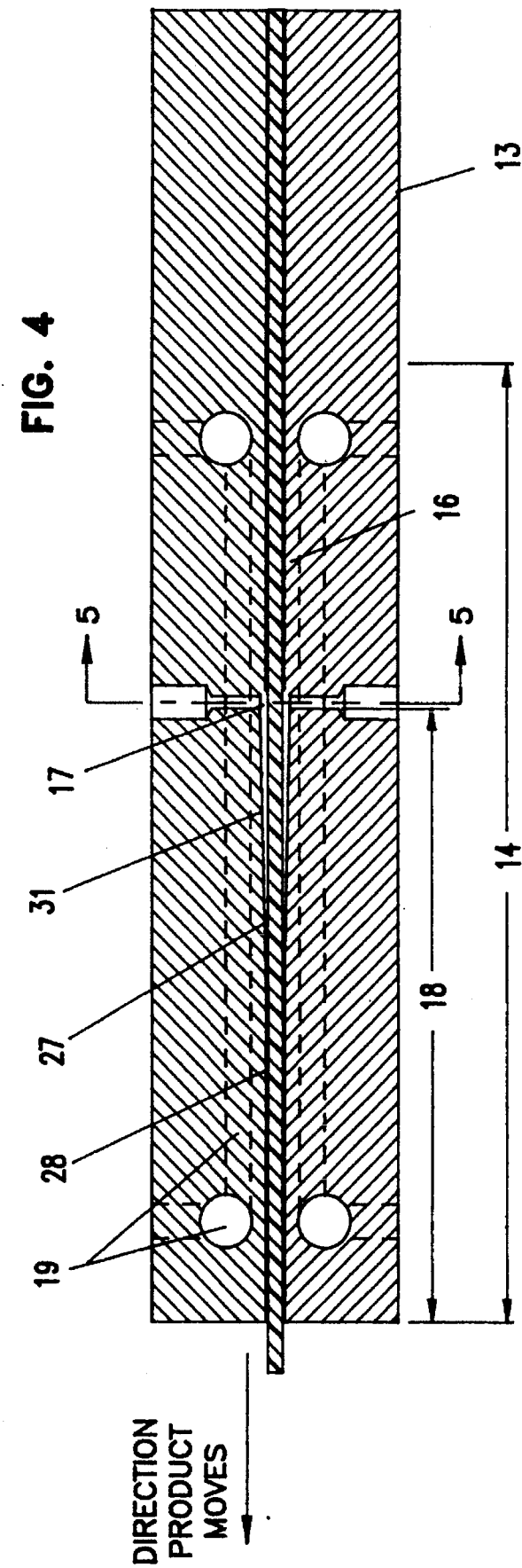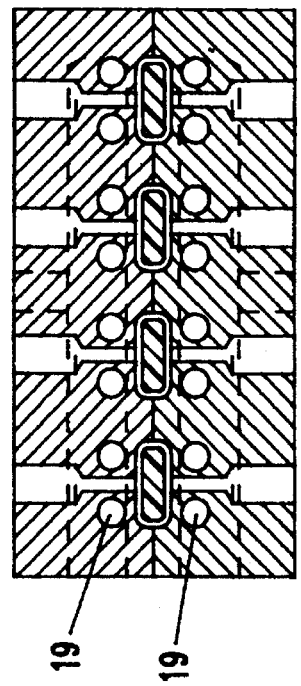

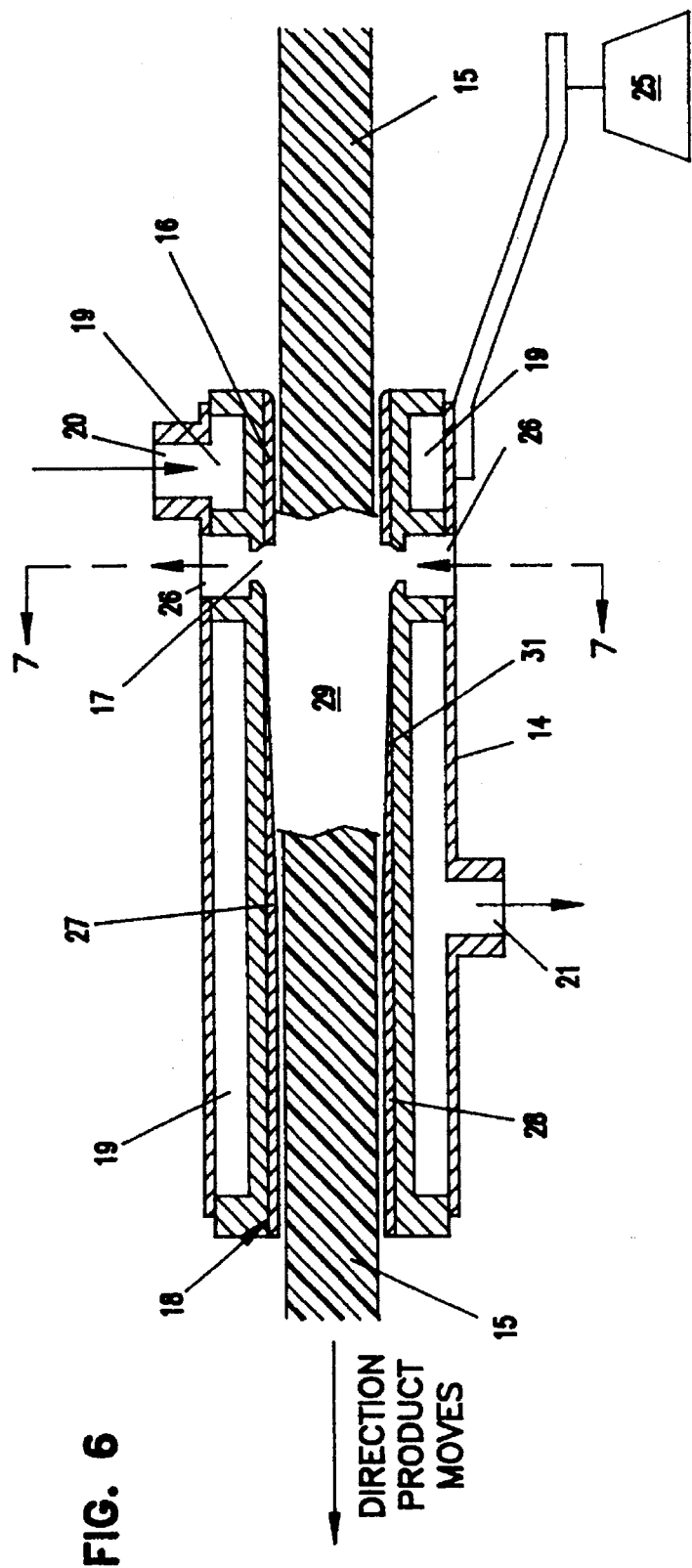
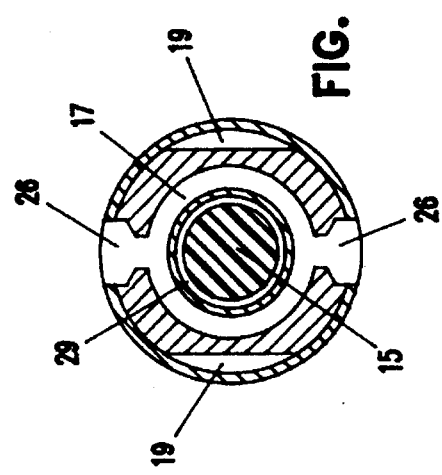

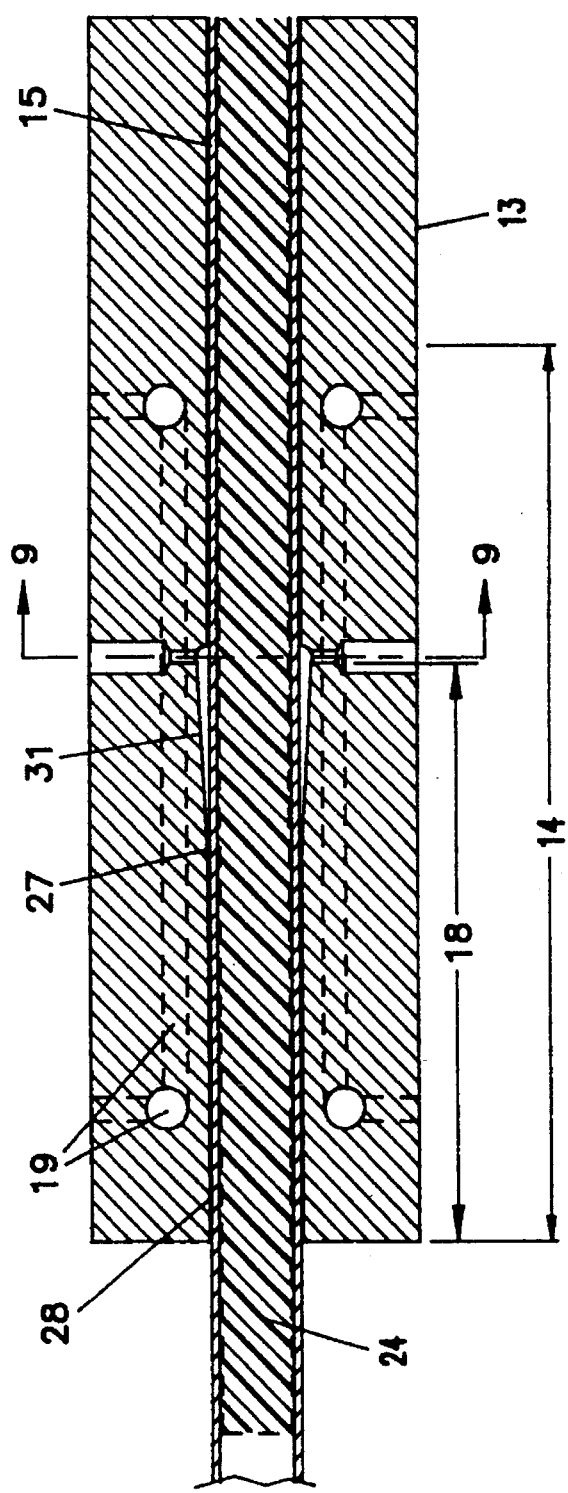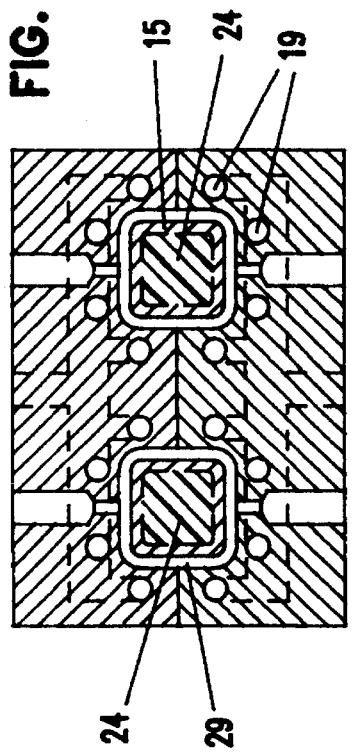

APPARATUS AND METHOD FOR IN-LINE COATING OF PULTRUSION PROFILES

This is a continuation, of application Ser. No. 07/976,898, filed Nov. 16, 1992, now abandoned.

FIELD OF INVENTION

This invention relates to a method and apparatus for in-line coating of pultrusion profiles and more particularly to a method and apparatus for in-line coating of pultruded fiber reinforced plastic profiles after initial cure.

BACKGROUND OF THE INVENTION

Pultruded profiles are well-known in the art and are generally formed by continuously pulling a reinforcing material through a curable or polymerizable liquid resin matrix and then through a die having a desired cross-section to shape the impregnated reinforcement material into a cured product having continuous length and a uniform cross-section that was formed by the die. Other methods such as injecting thermoset or thermoplastic resins into the reinforcing material or using pre-impregnated reinforcing material will yield similar results. Part cure can be achieved by heating the die with electric cartridge heaters or hot oil pumped through channels in the die. Also radio frequency, hot air heating or ultra violet radiation techniques have been used to effect a partial or full cure to resins for part solidification. These processes result in strong, yet light weight, parts that can be cut to any desired length.

Unfortunately, the surface characteristics of these pultruded profiles have some disadvantages. First, the reinforcing fibers are very close to the surface of the part, say less than 0.0005 inches. Therefore, any small amount of surface degradation (which can be a color change and/or erosion of the resin) from ultraviolet exposure, abrasion, chemical attack, wind erosion or the like will expose the reinforcing fibers. Exposing the reinforcing fibers to the elements will create an unsightly looking part and/or a part that is uncomfortable to handle. Continued exposure will cause both the resin matrix and reinforcing fibers to be eroded and eventually the physical properties of the part will be adversely effected, reducing the parts effective useful life.

One method for solving this problem is to use high performance resins instead of the commonly used pultrusion resins. Unfortunately, this method results in a substantial cost increase in the parts because 30% to 70% of the finished part is made up of the resin matrix.

A second method for solving this problem is to use a surfacing mat such as a polyester veil. This method will result in some increase in the part cost but more importantly it does not protect the part from surface degradation such as discoloration and chalking. Therefore, it is not an acceptable solution for many applications where appearance over extended periods of time, say greater than 5 years, is important. However, it does significantly increase the length of time before the reinforcing fibers become exposed to the elements. A third method involves the addition of additives such as UV-5411, which is manufactured by the American Cyanamid Company, to the resin matrix. This can slow down the erosion process but only provides marginal improvement and again is not an acceptable solution in many applications. It is common to combine methods two and three for best results with this type of technology.

A fourth method for solving the surface erosion problems associated with pultruded profiles is to apply a 0.0005 to 0.0050 inch thick high performance coating material onto the part's surface. Applying a high performance coating, sometimes combined with previous techniques is the ultimate answer to protecting the surface of a pultruded part. Normally, this is done as a separate operation using either powder or high solvent coatings that are sprayed onto the part and then cured by passing the parts through ovens. In both cases, final part costs increase substantially due to the extra labor for part handling, high equipment costs, high energy costs, and a significant increase in the amount of total space required. Also, the elapsed time to produce a finished part is increased substantially. In addition, spraying always involves a certain amount of waste due to over spray which creates both cost and disposal problems. Over spray is even a greater problem with most pultruded parts because they typically are not conductive, therefore electrostatic spray methods, a common method of reducing over spray, cannot easily be used. Finally, liquid spray coatings contain a high level of solvents. These solvents have to be evaporated off which in turn create environmental problems.

Therefore, there arises a need for a cost-effective method for applying a coating material to the surface of pultrusion profiles during the pultrusion process that are considered environmentally sound.

SUMMARY OF THE INVENTION

The present invention is for a method and apparatus for in-line coating of pultrusion profiles. This invention provides a single step low cost method for preventing surface degradation of pultruded parts. The use of the invention also results in a coated pultruded part as the part exits the pultrusion line, therefore, eliminating the time and cost associated with secondary coating operations. The present invention typically uses a high solids type coating material which minimizes or eliminates the need to evaporate off solvents. Also, the application of the present invention eliminates the waste associated with spraying operations. Finally, heat that has been used to cure the pultruded part can be retained and used to help cure the coating.

The invention incorporates a pultrusion die for forming a pultruded part of a predetermined shape, means for sealing the coating from squeezing out of the coating applicator in a direction opposing the movement of the part, means for applying a coating to the pultruded part after it exits the pultrusion die, a coating die with an area generally greater than the area of the pultrusion die, and means for curing the coating on the pultruded part. The invention begins by pulling reinforcing fibers that have been impregnated with a resin matrix through a pultrusion die to form a pultruded part. A coating is then applied to the part after it exits the pultrusion die to form a coated pultruded part. The coating on the coated pultruded part is then cured.

BRIEF DESCRIPTION OF THE DRAWINGS

FIG. 2 is a cross-sectional view of a coating die for use with the invention that is arranged and configured to be attached to the end of a pultrusion die;

FIG. 3 is a cross sectional view of FIG. 2 as viewed from section 3—3;

FIG. 4 is a cross sectional view of a second embodiment of a coating die for use with the invention wherein the coating die is machined into the exit end of the pultrusion die;

FIG. 5 is a cross sectional view of FIG. 4 as viewed from section 5—5;

FIG. 6 is a cross sectional view of a third embodiment of a coating die for use with the invention where the coating die is arranged to "float on" or is supported by the pultruded part;

FIG. 7 is a cross sectional view of FIG. 6 as viewed from section 7—7;

FIG. 8 is a cross sectional view of a coating die and pultrusion die for use with the invention that are arranged and configured to create coated pultruded tube members;

FIG. 9 is a cross sectional view of FIG. 8 as viewed from section 9—9;

DETAILED DESCRIPTION OF THE PREFERRED EMBODIMENT

Figure 1:
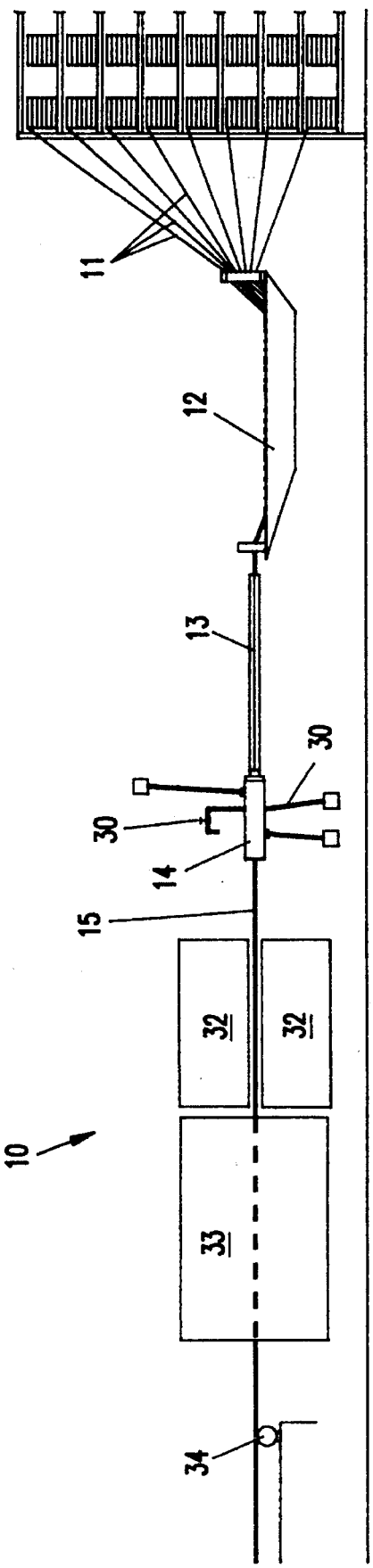
FIG. 1 is a diagrammatic view of a typical pultrusion production line incorporating the invention.

Referring now to the drawings wherein like numerals designate like parts, the present invention will be described in detail with reference to the key elements of the invention as used in a pultrusion production line, generally designated as 10 and shown in FIG. 1, for in-line coating of 11/16 inch diameter pultruded rods. Those skilled in the art will recognize that other shapes and sizes of pultruded profiles and tubular or hollow pultruded profiles could be coated with the present invention. However, different shapes and hollow profiles create unique problems for in-line coating of pultruded profiles and these issues are addressed by FIGS. 2–9.

Referring to FIG. 1, the process begins by pulling a plurality of rovings 11 through a resin bath 12 and into a pultrusion die 13. A roving 11 typically consists of 4000 to 5000 glass fibers. While the sizes and numbers of rovings 11 used could vary, the use of 45 to 55 rovings 11 with a yield of 113 yards per pound are preferred for this application. A polyester thermoset resin would be used with the preferred embodiment, however, those skilled in the art would recognize that other types of resins including vinyl esters, epoxies, phenolics and a variety of thermoplastic resins could be used with the invention. It is important that the resin selected will control the shrinkage of the pultruded part 15 in such a way so that as the part 15 moves from the pultrusion die 13 and through the coating die 14 the part's cross sectional area is controlled to the extent that the clearance between the exit portion 18 of the coating die 14 and the pultruded part 15 remains constant. This is important to help control the uniformity of the coating thickness. It should be recognized that other types of reinforcements such as carbon, aramid or a variety of man made or natural fibers can be used as the rovings 11. In addition, these fibers as well as the previously described glass fibers can be used in different forms such as in continuous strand mats, chopped strand mats, woven rovings or the like.

The pultrusion die 13 is typically heated to a temperature of 250° F. to 350° F. and has a length from about 18 to 84 inches to assure that the resin is cured or gelled before exiting the pultrusion die 13 at run speeds that allow economical processing of pultruded profiles, typically in excess of 30 inches per minute. However, any type of die and curing method that will harden or gel (semi-cure) the resin before it exits the pultrusion die 13 or before it enters the coating die 14 could be used with the invention. Those skilled in the art would recognize that other types of resins may require other impregnation methods, die configurations or curing methods.

Upon exiting the pultrusion die 13, the pultruded part 15 enters a coating die 14, best shown in FIGS. 2–9. Referring now to FIG. 2, the coating die 14 has an inlet portion 16, a coating chamber 17, exit portion 18 and a generally centrally located axial aperture 29 through which the pultruded part 15 moves. The coating die 14 also contains a cooling jacket 19 to maintain the temperature of the coating material below the level at which the coating material would cure. The cooling jacket in FIG. 2 surrounds the outer surface of the inlet portion 16, the coating chamber 17 and the exit portion 18. The cooling jacket 19 receives cooling water from radial aperture 20 which is connected to a coolant pump (not shown). Coolant exits radial aperture 21. After exiting radial aperture 21, the water typically enters a heat exchanger (not shown) to reduce the temperature of the coolant before it returns to the pump.

In the example shown in FIG. 2, the coolant temperature would be maintained at between 40° F. and 120° F. to maintain the temperature of the coating material that is in contact with the coating die surfaces below approximately 120° F. to about 180° F. The cooling effect of the coolant must counteract the heating effect of the pultruded part 15 which may exit the pultrusion die 13 at temperatures as high as 400° F. or possibly higher if one were pultruding thermoplastics. FIGS. 4 and 8 teach alternative methods of cooling to control the temperature of the coating material in contact with the coating die 14.

It should be noted that typically the pultruded part 15 is only cooled on its surface as it passes through the coating die 14 and a significant amount of heat is retained in the part. As the coated pultruded part 15 leaves the coating die 14, this internal heat transfers back to the surface of the pultruded part 15 and into the coating. Thus, the heat that is retained in the pultruded part 15 assists in the final cure of the coating that has been applied. On some large volume parts, this heat could actually be sufficient to complete the cure of the coating. On smaller volume parts, additional heat via infrared and/or hot air ovens 32, 33 is required to complete the cure.

The inlet portion 16 of the coating die 14 is generally the same shape and size as the pultrusion die 13 with a length that is arranged and configured to provide a sufficiently tight seal to prevent the coating material from squeezing out of the entrance to the coating die 14. This length is typically dependent upon the method of attaching the coating die 14 to the pultrusion die 13. The method of attachment can have a significant effect on how well the aperture 29 of the coating die 14 is aligned with the cavity of the pultrusion die 13. This alignment is critical to controlling the uniformity of the coating being applied to the pultruded part 15 by the coating die 14, particularly when the part has a large cross section that makes it rigid. A rigid part will not flex, therefore any mis-alignment will cause the coating to be thicker on one side of the part and thinner on the other.

The coating chamber 17 is also generally the same shape as the pultrusion die 14 with an outer perimeter generally greater than the inside diameter of the inlet portion 16 and the inlet inside diameter of the exit portion 18. The coating chamber 17 contains one or two radial apertures 26. One radial aperture 26 is used to pump coating into the coating chamber 17 and the second radial aperture 26 can act as a drain. The preferred method for pumping the coating into the coating chamber 17 is to use a pressure pot (not shown). The double aperture arrangement allows one to flush or clean out the coating portion of the coating die 17 by introducing a flushing fluid such as Shipshape® from GAF Chemicals into the radial aperture. This process may be necessary to flush out the coating material when the process is shut down or when one makes a color change.

The double aperture also allows intermittent or continuous draining or circulation of the coating material. Draining or circulation of the coating may be desirable to help keep the coating material in the coating chamber 17 of the coating die 14 from gelling or curing and allows continuous or intermittent flushing of the coating chamber 17 to remove debris that may be deposited by the pultruded profile 15 passing through the coating die 14. The coating chamber 17 of the coating die 14 is larger than the inside diameter of the entrance portion 16 by say 0.005 to 0.200 inches in the outward radial direction to enable the coating to flow around the pultruded part 15 and be applied to the portion of the part surface to be coated. If a different profile were pultruded, the coating chamber 17 would be configured to match the profile of the new part.

The diameter or shape of the portion of the axial aperture 29 in the exit portion 18 is critical to controlling the amount and uniform thickness of the coating applied to the pultruded profile. Two different basic profiles or shapes have been used to date. One approach is where axial aperture 29 of the exit portion 18 has a uniform cross section over its entire length and is 0.0006 to 0.0200 inches in diameter larger than the axial aperture 29 of the entrance portion 16. A second approach involves tapering the axial aperture 29 in the exit portion 18 as shown in FIGS. 2, 4, 6 and 8. The large portion of the tapered portion 31 would start at the entrance to the exit portion 18 and the tapered portion 31 would extend to a distance of 30% to 100% of the length of the exit portion 18. At the end 27 of the tapered portion 31, the axial aperture 29 of the exit portion 18 will have a uniform cross section over its remaining length and again would be 0.0010 to 0.0200 inches in diameter larger than the axial aperture 29 of the entrance portion 16.

Figure 10:
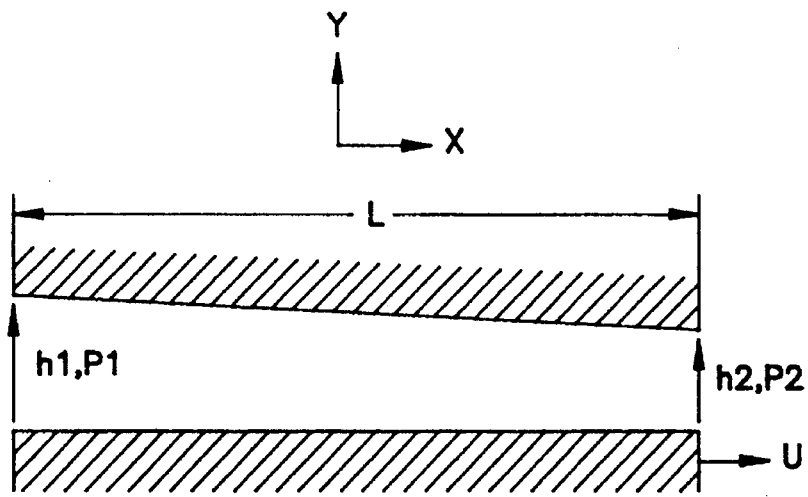
FIG. 10 is a schematic view of a taper for use in calculating the maximum pressure built by the taper.

The effect of this taper can be characterized by the following fluid flow derivations made from Reynold's Lubrication Equation and as illustrated in FIG. 10, with these assumptions being made:

incompressible flow
Newtonian fluid
steady flow
dh/dx small
Re*(dh/dx) small
two dimensional flow The following variables are used in the equations:

$Re$   Reynolds number
$h_1$   initial (maximum) height at the taper entrance
$h_2$   final (minimum) height at the taper exit
$P_1$   coating pressure at the taper entrance
$P_2$   coating pressure at the taper exit
$L$   length of the taper
$U$   velocity of the pultrusion
$x,y$   axes ($x = 0$ at the taper entrance)
$P_m$   maximum pressure
$h_m$   height of taper at location where $Pm$ occurs
$\alpha$   $(h_1 - h_2)/L$
$\mu$   viscosity $$h_m = 2h_1 \frac{\left(\left(\frac{\alpha h_1(P_2 - P_1)}{6U\mu}\right) - (h_1/h_2 - 1)\right)}{(1 - h_1^2/h_2^2)}$$

and $$P(x) = \frac{6U\mu}{\alpha h_1}\left(\left(\left(\frac{h_1}{(h_1 - \alpha x)}\right) - 1\right) - \frac{h_m}{2h_1}\left(\left(\frac{h_1^2}{(h_1 - \alpha x)^2}\right) - 1\right)\right) + P_1$$

The taper has the effect of increasing the pressure of the coating material that is contained in the exit portion 18. This increase in pressure helps distribute the coating around the perimeter of the part to be coated and can help the pultruded part 15 remain centered in the exit portion 18 of the coating die 14. This occurs because as the pultruded part 15 drifts to one side of axial aperture 29, the pressure on that side increases and the pressure on the opposite side decreases thereby creating forces that tend to re-center the part. This is particularly true with small diameter or thin solid shapes which do not tend to be self supporting.

Figure 15:
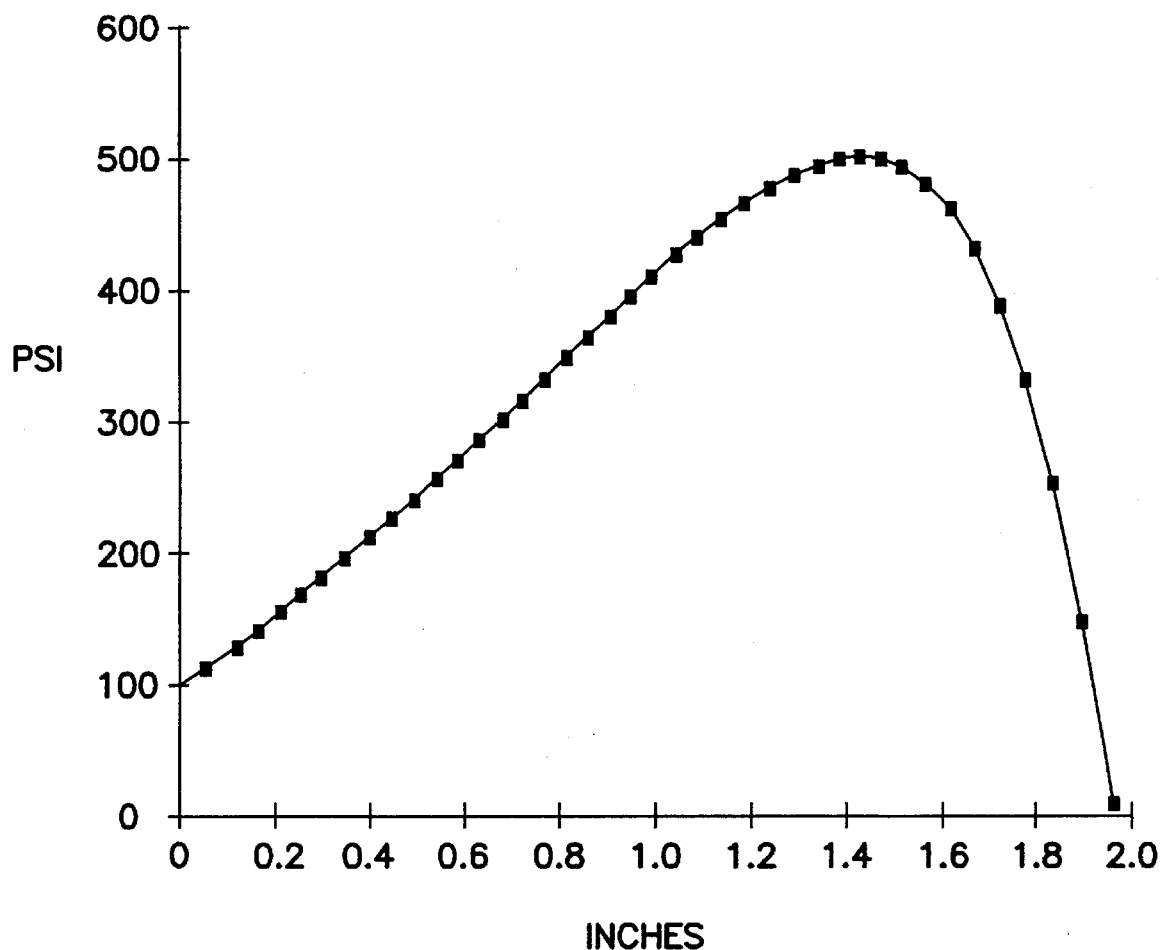
FIG. 15 is a graph of a pressure distribution.

Typical values that define the taper are as follows:

$P_1$—10 to 400 psi $P_2$=atmospheric pressure $h_1$—0.0010 to 0.0200 inches $h_2$—0.0005 to 0.0080 inches L—0.50 to 4.00 inches U—0.2 to 3.0 inches per second $\mu$—100 to 30,000 centipoise For example, if $P_1$=100 psi, $P_2$=14.7 psi, $h_1$= 0.0050 in, $h_2$=0.0015 in, L=1.96 in, U=1.0 in/sec and $\mu$=14,000 centipoise, dh/dx=$\alpha$=0.00178 and Re=1.6×10$^{-4}$. Thus dh/dx is small and Re*(dh/dx) is small, verifying a few of the assumptions made earlier. In this example, the pressure distribution would be as shown in FIG. 15. The maximum pressure built by the taper would be 502 psi, and would occur at a distance of 1.48 inches.

In some cases it may be necessary to coat only a portion of the perimeter of the pultruded part 15. In this case, the radial aperture 29 that surrounds the portion of the pultruded part 15 that is not to be coated is the same throughout the length of the coating die 14 and is equal to the exit portion of the pultrusion die 13 and the entrance portion 16 of the coating die 14.

It should be noted that several different schemes for designing the exit portion 18 of the coating die 14 could be used, including those illustrated in FIGS. 11–14.

Figure 11:
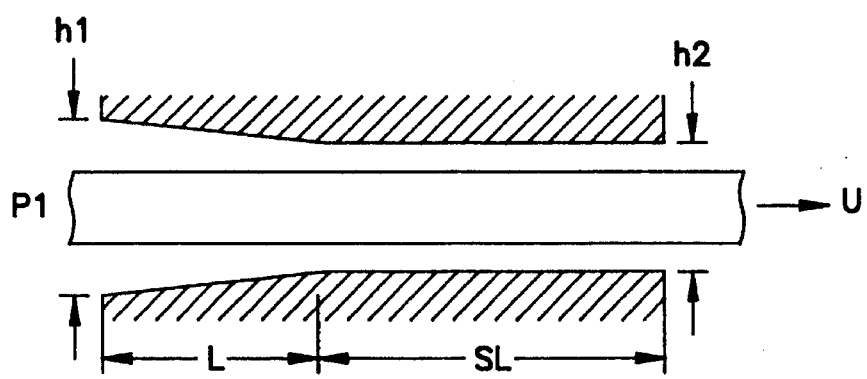
FIG. 11 is a schematic view of the preferred embodiment of the exit portion of a coating die for use with the invention.
Figure 12:
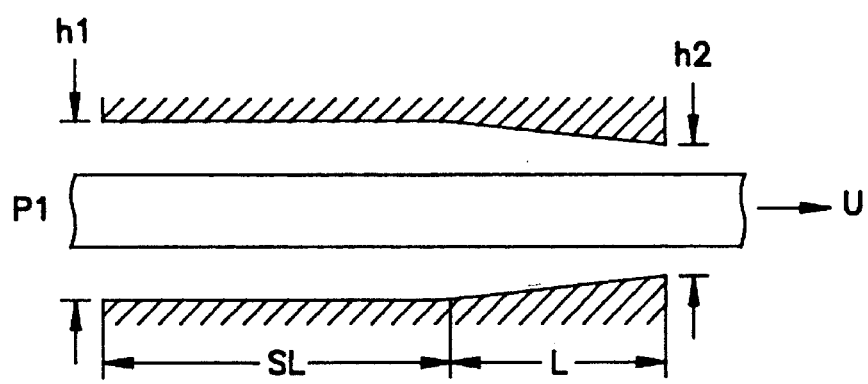
FIG. 12 is a schematic view of a second embodiment of the exit portion of a coating die for use with the invention.
Figure 13:
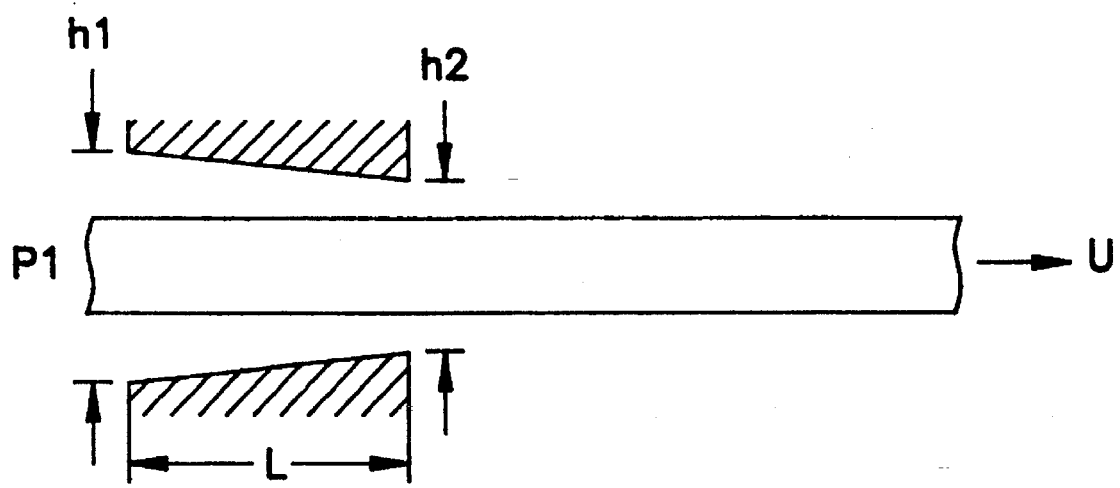
FIG. 13 is a schematic view of a third embodiment of the exit portion of a coating die for use with the invention.
Figure 14:
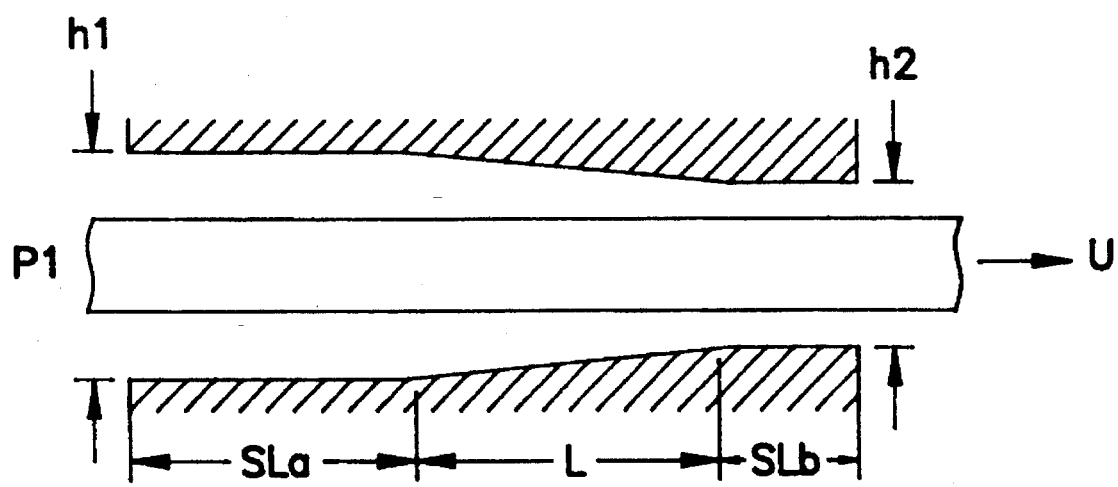
FIG. 14 is a schematic view of a fourth embodiment of the exit portion of a coating die for use with the invention.

The first scheme, FIG. 11, is the preferred embodiment and is characterized by L=2.5", $h_1$=0.007", $h_2$=0.0015", $P_1$=120 psi, and SL=3.5". The long straight portion (SL) acts as a seal and keeps the coating from flowing through the gap due to pressure P when the product is stopped for a short period of time. The second scheme, FIG. 12, is characterized as a straight gap followed by a taper. The third scheme, FIG. 13, is characterized by a taper only. This design may be the easiest to manufacture, particularly for certain profiles such as rounds, but may allow too much coating onto the part and/or allow the coating to squeeze past the exit end of the coating die when the product is stopped. It also may not be as effective in centering the part. The fourth scheme, FIG. 14, is a combination of FIGS. 11 and 12. The exit straight portion $SL_b$ would be much shorter than the long strait portion (SL) in FIG. 11, possibly ¼" to ½".

The coating die 14 can be made of several different materials including aluminum, steel, stainless steel or plastic. The coating die 14 may be coated or plated for corrosion and/or wear resistance or for nonstick characteristics or for ease of cleaning. Also, several methods of manufacture may be used and those skilled in the art of material selection and machining or molding techniques would recognize the best approach after considering issues such as dimensional precision, wear, heat transfer, cleanability, corrosion resistance, specific application and cost.

The preferred type of coating for use with the invention is Polane Glaze IMC™ supplied by the Sherwin Williams Company. This coating cures when subjected to a temperature of 300° F. for approximately twenty seconds, but it will not cure in a short time at a temperature below 200° F. Therefore, this coating will not typically cure in the coating die 14. Because of the high viscosity of the Polane coating material, this coating must be pumped through a coating tube 30 and into the coating chamber 17, preferably at a pressure of 10–400 psi and more preferably at a pressure of 120 psi.

Because the coating is introduced under pressure, the coating die 14 must be sealed in some manner to prevent the coating from squeezing out of the exit portion 18 of the coating die 14. The sealing method used in the preferred embodiment is to utilize a long straight portion 28 in the exit portion 18 of a sufficient length to act as the sealing means. A long straight portion 28 with a length approximately 0.10 to 8.00 inches and more preferably at a length of 3.50 inches is sufficient to control the introduction of the coating at a pressure of 120 psi. It should be recognized that other lengths and pressures can be used.

It should be recognized that many other thermoset type coating materials, including materials with both lower and higher viscosities, that are catalyzed in such a way to give similar cure characteristics and coating materials using other types of catalysts requiring different curing techniques such as ultra violet light can be used with this invention. However, the use of the current coating is preferred because it has the desirable weathering characteristics and because it is a high solids type material and avoids the toxic vapors that would be associated with the curing of less viscous coatings that contain solvents.

After exiting the coating die 14, the coating on the pultruded part 15 must be cured. In the preferred embodiment, the pultruded part 15 enters an infrared oven 32 to quickly raise the temperature of the surface of the pultruded part 15 to the curing temperature of 300° F. to 350° F. After exiting the infrared oven 32, the pultruded part 15 enters a hot air oven 33 to maintain the curing temperature for the necessary curing time, approximately twenty to thirty seconds for the preferred coating. Changes in coating material and/or catalyst can alter the time/temperature ratio. Therefore, the length of the hot air oven 33 must be sized in relation to the desired product speed to allow for the necessary curing time, e.g., if the speed of the pultruded part 15 is 30 inches/min, the hot air oven 33 length must be at least 10 inches. This length may be effected, however, by the temperature the coating is at when leaving the infrared oven and the length of the infrared oven.

After exiting the ovens 32 and 33, the coated pultruded part 15 may pass over an adjustable roller 34 before reaching a pulling means (not shown). Any pulling means known in the art could be used with the invention, therefore, a detailed description of the pulling means is not included herein. The adjustable roller 34 may be used to help align the pultruded part 15 with the axial aperture 29 in the coating die 14. The roller 34 or similar such support can be used in addition to the taper discussed earlier to assist in aligning the pultruded part 15. Because of the thinness of the coating, if the pultruded part 15 is not aligned with the axial aperture 29, the coating could be rubbed off of one side of the pultruded part 15 as it exits the coating die 14. Those skilled in the art would recognize that other means could be used to align the pultruded part 15 with the axial aperture 29 of the coating die 14.

A second embodiment of the invention, shown in FIGS. 4 and 5, illustrates a second method of constructing the coating die 14 by machining it out of the end of the pultrusion die 13. FIGS. 4 and 5 show a four cavity split die with a coating die machined out of the end of each of the four pultrusion cavities. Typically, the pultrusion die is manufactured first with the part cavity machined into the full length of the pultrusion die 13 and the coating die 14. In this case, the exit of the pultrusion die 13 and the entrance portion 16 of the coating die 14 may be the same. Subsequently, the coating chamber 17 and the exit portion 18 of the coating die 14 as well as cooling passages 19 are machined to effect the same results achieved in the preferred embodiment.

A third embodiment of the invention, shown in FIGS. 6 and 7, illustrates a method of constructing a coating die 14 whereby the coating die 14 is separated from the pultrusion die 13 by some distance, preferably two to thirty six inches. However, it is possible to place the coater anywhere along the length of the pultrusion line, including beyond the pulling means. The disadvantage of the later is that one loses the heat that is contained in the pultruded part that was created during the cure of the part itself to assist in the cure of the coating. However, an advantage with this method would be that the coating could be applied after the part passes through the pulling clamps which may create marks on the coated part.

This third method allows the coating die 14 to "float" on the pultruded profile 15 and follow the pultruded profile when it moves off center after exiting the pultrusion die 13 and/or coating die 14. This ability of the coater 14 to float on the pultruded part 15 plus the addition of a counter weight 25 to off-set the weight of the exit portion 18 of the coater 14 will aid the process of keeping the pultruded part 15 centered in the aperture 29 and obtaining a uniform coating around the entire perimeter of the pultruded part to be coated. In addition, the physical separation of the coating die 14 from the pultrusion die 13 offers several other advantages.

First, one can visually inspect the pultruded part for imperfections prior to coating.

Second, the pultruded part can be cooled with an air knife or some similar means prior to coating. This will assist the process of keeping the coating material below the cure temperature in the coater and may allow one to eliminate the need for cooling chambers 19. In addition, the physical separation of the coater 14 from the pultrusion die 13 also eliminates heat transfer directly from the pultrusion die 13 to the coating die 14. Heat transfer to the coating die 14 is now only via conduction from the pultruded part 15 as it moves through the coating die.

Third, one can remove any small particles from the pultruded part 15 after it exits the pultrusion die 13 but before it enters the coating die 14. This can be achieved with air jets or some similar means and will assist in achieving a defect free coated part. It should be recognized that cooling and cleaning the part may be accomplished at the same time with the same device.

Fourth, one can easily remove the coating die 14 from the pultrusion production line. This can now be accomplished by sliding the coating die 14 off the exit end of the part, or if the coating die 14 is made as a split die it can be removed simply by separating the two halves of the coating die 14.

A fourth embodiment of the invention, shown in FIGS. 8 and 9, illustrates how a coating die 14 for hollow tubes or shapes could be constructed. When the pultruded part 15 exits the pultrusion die 13 it is typically very hot, say around 400° F. At this temperature or even temperatures above 200° F., the resin matrix is easily deformed. Thus, the walls of a hollow part that goes through the coating die 14 without support would typically be deformed radially inward due to the pressure of the coating against the part inside the coating die 14. To avoid this, the mandrel 24 that is used to form the hollow portion of the pultruded profile 15 is extended through the coating die 14. The other features of this fourth embodiment are similar to the second embodiment shown in FIGS. 4 and 5.

In a fifth embodiment, the outer surface of the coated pultruded part 15 could be roughened prior to the curing of the coating. A pultruded part 15 with a roughened surface would be desirable for use as a reinforcing rod for concrete, as a mine bolt or other similar applications. It may be desirable to apply a thicker coating for this application, say 0.003–0.020 inches. One method for roughening the surface of the coated pultruded part 15 would be to use pulsed air jets after the part exits the coating die 14, but before the coating cures.

Although characteristics and advantages, together with details for structure, materials, function and process steps have been described in reference to a preferred embodiment herein, it is understood that the disclosure is illustrative. To that degree, various changes made, especially to the matters of shape, size and arrangement, to the full extent intended by the general meaning of the terms in which the appended claims are expressed, are within the principles of this invention.

What is claimed is:

1. A method for in-line coating of pultrusion profiles comprising the steps of:

a) pulling a combination of reinforcing fibers and resin through a pultrusion die to form a pultruded part with an outside surface;

b) allowing the resin to at least semi-cure prior to coating;

c) applying a protective coating, comprising a material other than the resin, to the pultruded part by pulling the pultruded part through a coating die having a rigid tapered section to form a coated pultruded part, the tapered section having a decreasing cross-sectional area in a downstream direction such that a substantial increase in a pressure of the coating along an outside surface of the pultruded part is achieved, thereby causing the part to be substantially centered; and d) curing the coating on the coated pultruded part.

2. A method for in-line coating of pultrusion profiles according to claim 1, wherein the protective coating is Polane Glaze.

3. A method for in-line coating of pultrusion profiles according to claim 2, wherein the curing step consists of subjecting the coating to a temperature of about 300° F. for about twenty to thirty seconds.

4. A method for in-line coating of pultrusion profiles according to claim 1, wherein the curing step is performed by passing the coated pultruded part through a heater.

5. A method for in-line coating of pultrusion profiles according to claim 4, wherein the heater comprises an infrared heater and hot air oven aligned in series.

6. A method for in-line coating of pultrusion profiles according to claim 1, wherein the step of applying the coating is performed by pumping coating into the coating die and onto the outside surface of the pultrusion profile.

7. An apparatus for in-line coating of pultrusion profiles comprising:

a) a pultrusion die for forming a pultruded part of a predetermined shape and having an outside surface;

b) means for substantially hardening the pultruded part prior to coating;

c) a coating die having an entrance portion, an exit portion and a coating chamber generally located therebetween;

d) means for applying a uniform coating to the pultruded part, including the coating chamber where the coating is first applied and a rigid tapered portion of the exit portion of the coating die along which the coating is held under pressure, the taper having a decreasing cross-sectional area in a direction away from the coating chamber such that, primarily as a result of the taper, a substantial increase in the pressure of the coating along the outside surface of the pultruded part is achieved, thereby causing the part to be substantially centered; and e) means for curing the coating on the pultruded part.

8. An apparatus for in-line coating of pultrusion profiles according to claim 7, wherein the means for curing the coating is heaters.

9. An apparatus for in-line coating of pultrusion profiles according to claim 7, wherein the means for applying a coating to the pultruded part includes a pump that transfers the coating into the coating chamber through a radial aperture in the coating die.

10. An apparatus for in-line coating of pultrusion profiles according to claim 7, wherein the means for applying a coating to the pultruded part includes a pressure pot that transfers the coating into the coating chamber through a radial aperture in the coating die.

11. An apparatus for in-line coating of pultrusion profiles according to claim 7, wherein the outside surface of the pultruded part, the coating chamber and the coating die are cooled to a temperature below the curing temperature of the coating material.

12. An apparatus for in-line coating of pultrusion profiles according to claim 7, wherein the exit portion further includes a straight portion with a constant cross-sectional area downstream of the tapered portion.

13. An apparatus for in-line coating of pultrusion profiles according to claim 7, wherein the exit portion further includes a straight portion with a constant cross-sectional area upstream of the tapered portion.

14. An apparatus for in-line coating of pultrusion profiles according to claim 7, wherein the exit portion further includes straight portions with a constant cross-sectional area both downstream and upstream of the tapered portion.

15. An apparatus for in-line coating of pultrusion profiles according to claim 7, wherein the tapered portion extends through the entire exit portion of the coating die.

16. An apparatus for in-line coating of pultrusion profiles comprising:
   a) a pultrusion die for forming a pultruded part of a predetermined shape and having an outside surface;
   b) means for hardening the pultruded part prior to coating;
   c) a coating die having an axial aperture extending therethrough defining a wall, an inlet portion with a means for cooling the inlet portion below the temperature at which the coating will cure, an exit portion with a means for cooling the exit portion below the temperature at which the coating will cure, a coating chamber generally located between the inlet portion and the exit portion that is arranged and configured, in cooperation with a rigid tapered portion of the exit portion, to apply a uniform coating on the outside surface of the pultruded part, the taper having a decreasing cross-sectional area in a direction away from the coating chamber such that, primarily as a result of the taper, a substantial increase in a pressure of the coating along the outside surface of the pultruded part is achieved, thereby causing the part to be substantially centered;
   d) pumping means for pumping coating into the coating chamber;
   e) heating means for curing the coating after the pultruded part exits the coating die; and
   f) means for pulling the pultruded part through the pultrusion die, coating die and heating means.

17. An apparatus for in-line coating of pultrusion profiles according to claim 16, wherein the length of the exit portion is arranged and configured to seal the coating die and prevent excessive quantities of pressurized coating from squeezing out of the exit portion.

18. An apparatus for in-line coating of pultrusion profiles according to claim 16, wherein the pressure source can increase the pressure of the coating from 10 to 400 psi.

19. An apparatus for in-line coating of pultrusion profiles according to claim 16, wherein the area of the axial aperture in the exit portion is arranged and configured to be larger than the area of the axial aperture in the inlet portion by an amount that results in one half to five mils of coating being applied to the outside of the pultruded part exiting the inlet portion.

20. An apparatus for in-line coating of pultrusion profiles according to claim 16, wherein the area of the axial aperture in the exit portion is tapered with the entrance to the taper being larger than the exit of the taper and the exit of the taper being arranged and configured to be larger than the axial aperture in the inlet portion by an amount that results in one half to five mils of coating being applied to the outside of the pultruded part.

21. An apparatus for in-line coating of pultrusion profiles according to claim 16, wherein the coating die is detached from the putrusion die and is allowed to "float" or ride on the pultruded part such that, as the pultruded part drifts off center, the pultruded part is re-centered.

22. An apparatus for in-line coating of pultrusion profiles according to claim 16, wherein the coating die is detached from the pultrusion die, but is arranged and configured to be attached to some other portion of the in-line coating apparatus, either rigidly or so that the coating die is free to move radially to and from the pultruded part as internal forces are applied to the coating by the pultruded part moving through the coating die such that, as the pultruded part drifts off-center, the pultruded part is re-centered.

23. An apparatus for in-line coating of pultrusion profiles according to claim 16, wherein the coating die and a cooling jacket are machined into the exit end of the pultrusion die.

24. An apparatus for in-line coating of pultrusion profiles according to claim 16, wherein the pultrusion die includes a mandrel portion that extends through the coating die to provide support to a tubular pultruded part as the pultruded part passes through the coating die.

25. An apparatus for in-line coating of pultrusion profiles according to claim 16, wherein a portion of the axial aperture is aligned through the inlet portion, coating chamber and exit portion such that the coating is applied to only a portion of the outer surface of the pultruded part.

26. An apparatus for in-line coating of a pultrusion profile according to claim 16, wherein the apparatus further comprises means for roughening the surface of the coating after the coating is applied to the pultruded part but prior to curing the coating.

27. An apparatus for in-line coating of pultrusion profiles according to claim 16, wherein the means for cooling the coating die is pumping coolant through cooling jackets in the coating die.

28. An apparatus for in-line coating of pultrusion profiles according to claim 16, wherein the axial aperture of the coating die is arranged and configured to align with the exit of the pultrusion die such that the coating being applied to the pultruded part is uniform around the outer surface of the pultruded part.

29. An apparatus for in-line coating of pultrusion profiles according to claim 16, wherein the axial aperture has an exit area and an entrance area on opposite ends of the axial aperture, with the exit area larger than the inlet area.

30. An apparatus for in-line coating of pultrusion profiles according to claim 16, wherein the coating chamber includes means for cooling the coating chamber.

* * * * *

UNITED STATES PATENT AND TRADEMARK OFFICE
CERTIFICATE OF CORRECTION

PATENT NO. : 5,492,583

DATED : February 20, 1996

INVENTOR(S) : Fingerson et al.

It is certified that error appears in the above-indentified patent and that said Letters Patent is hereby corrected as shown below:

Column 1, line 51; "A second" does not start a new paragraph.

Column 8, line 56; "25" should be in bold print.

Column 11, claim 17, line 36; delete "length of the" after the word "the".

Column 11, claim 18, line 41; "pressure source" should read --pumping means--.

Column 11, claim 19, lines 48, 49; delete "exiting the inlet portion" after the word "part".

Signed and Sealed this

Tenth Day of June, 1997

Attest:

BRUCE LEHMAN

Attesting Officer

Commissioner of Patents and Trademarks